US007599715B2

(12) United States Patent
Himmelstein

(10) Patent No.: US 7,599,715 B2
(45) Date of Patent: *Oct. 6, 2009

(54) SYSTEM AND METHOD FOR MATCHING WIRELESS DEVICES

(76) Inventor: Richard B. Himmelstein, 857 Fort Fisher Blvd. South, Kure Beach, NC (US) 28449

( * ) Notice: Subject to any disclaimer, the term of this patent is extended or adjusted under 35 U.S.C. 154(b) by 0 days.

This patent is subject to a terminal disclaimer.

(21) Appl. No.: 12/389,245

(22) Filed: Feb. 19, 2009

(65) Prior Publication Data

US 2009/0156125 A1 Jun. 18, 2009

Related U.S. Application Data

(63) Continuation of application No. 12/018,588, filed on Jan. 23, 2008, which is a continuation of application No. 11/524,858, filed on Sep. 20, 2006, now Pat. No. 7,450,955, which is a continuation of application No. 10/705,674, filed on Nov. 10, 2003, now Pat. No. 7,123,926, which is a continuation of application No. 09/659,074, filed on Sep. 11, 2000, now Pat. No. 6,647,270.

(60) Provisional application No. 60/153,424, filed on Sep. 10, 1999.

(51) Int. Cl.
*H04M 1/00* (2006.01)

(52) U.S. Cl. ............... 455/562.1; 455/550.1; 455/411; 455/445; 455/12.1; 340/426.19

(58) Field of Classification Search ............. 455/402.2, 455/456.1–457, 9, 550.1, 569.1–569.2, 521, 455/345, 517, 524, 557, 566, 403, 410–411, 455/445; 340/7.61–7.62, 7.55, 534, 539.1, 340/425.15, 426.19, 426.2, 426.22; 701/211, 701/29, 213, 200, 207; 342/357.01, 352, 342/357.02, 357.06, 357.09, 357.12; 348/14.01–14.03
See application file for complete search history.

(56) References Cited

U.S. PATENT DOCUMENTS 4,591,823 A 5/1986 Horvat (Continued)

OTHER PUBLICATIONS

Auerbach, Mitchell J., Emergency Management Communications System, U.S. Appl. No. 60/111,281, filed Dec. 7, 1998.

(Continued)

*Primary Examiner*—Kamran Afshar
(74) *Attorney, Agent, or Firm*—Lech Law, LLC; Robert R. Lech

(57) ABSTRACT

Vehicles and methods for providing a communication between a mobile unit and a vehicle are described. In one embodiment, a communication is received from a mobile unit, the communication is interfaced to a vehicle's electromechanical system, an audio-visual interface associated with the vehicle's electromechanical system displays the communication; and a communication is transmitted to the mobile unit.

31 Claims, 8 Drawing Sheets

U.S. PATENT DOCUMENTS

| | | | |
|---|---|---|---|
| 5,086,394 A | 2/1992 | Shapira | |
| 5,170,499 A | 12/1992 | Grothause | |
| 5,389,824 A | 2/1995 | Moroto et al. | |
| 5,418,836 A * | 5/1995 | Yazaki | 455/569.2 |
| 5,420,794 A | 5/1995 | James | |
| 5,422,816 A | 6/1995 | Sprague et al. | |
| 5,425,058 A | 6/1995 | Mui | |
| 5,451,964 A | 9/1995 | Babu | |
| 5,459,304 A | 10/1995 | Eisenmann | |
| 5,473,602 A | 12/1995 | McKenna et al. | |
| 5,483,692 A * | 1/1996 | Person et al. | 455/238.1 |
| 5,495,609 A | 2/1996 | Scott | |
| 5,539,398 A | 7/1996 | Hall et al. | |
| 5,572,201 A | 11/1996 | Graham et al. | |
| 5,663,734 A | 9/1997 | Krasner | |
| 5,668,880 A | 9/1997 | Alajajian | |
| 5,731,785 A | 3/1998 | Lemelson et al. | |
| 5,731,788 A | 3/1998 | Reeds | |
| 5,732,074 A | 3/1998 | Spaur et al. | |
| 5,740,532 A | 4/1998 | Fernandez et al. | |
| 5,805,082 A | 9/1998 | Hassett | |
| 5,847,661 A | 12/1998 | Ricci | |
| 5,875,183 A | 2/1999 | Nitadori | |
| 5,900,825 A | 5/1999 | Pressel et al. | |
| 5,907,793 A | 5/1999 | Reams | |
| 5,908,454 A | 6/1999 | Zyburt et al. | |
| 5,917,408 A | 6/1999 | Cardillo et al. | |
| 5,952,941 A | 9/1999 | Mardirossian | |
| 5,974,368 A | 10/1999 | Schepps et al. | |
| 5,982,281 A | 11/1999 | Layson | |
| 5,983,161 A | 11/1999 | Lemelson et al. | |
| 6,009,323 A | 12/1999 | Heffield et al. | |
| 6,014,090 A | 1/2000 | Rosen et al. | |
| 6,018,659 A | 1/2000 | Ayyagari et al. | |
| 6,018,699 A | 1/2000 | Baron et al. | |
| 6,026,162 A * | 2/2000 | Palett et al. | 379/454 |
| 6,028,537 A * | 2/2000 | Suman et al. | 340/988 |
| 6,032,054 A | 2/2000 | Schwinke | |
| 6,052,598 A | 4/2000 | Rudrapatna et al. | |
| 6,060,995 A | 5/2000 | Wicks et al. | |
| 6,064,893 A * | 5/2000 | O'Brien | 455/569.2 |
| 6,084,512 A | 7/2000 | Elberty et al. | |
| 6,084,870 A | 7/2000 | Wooten et al. | |
| 6,097,313 A | 8/2000 | Takahashi et al. | |
| 6,097,974 A | 8/2000 | Camp et al. | |
| 6,119,095 A | 9/2000 | Morita | |
| 6,122,514 A | 9/2000 | Spaur et al. | |
| 6,150,937 A | 11/2000 | Rackman | |
| 6,157,317 A | 12/2000 | Walker et al. | |
| 6,172,641 B1 * | 1/2001 | Millington | 342/357.13 |
| 6,177,873 B1 | 1/2001 | Cragun | |
| 6,195,542 B1 | 2/2001 | Griffith | |
| 6,199,045 B1 | 3/2001 | Giniger et al. | |
| 6,208,844 B1 | 3/2001 | Abdegany | |
| 6,208,862 B1 | 3/2001 | Lee | |
| 6,225,890 B1 | 5/2001 | Murphy | |
| 6,252,539 B1 | 6/2001 | Phillips et al. | |
| 6,252,544 B1 | 6/2001 | Hoffberg | |
| 6,255,953 B1 | 7/2001 | Barber | |
| 6,275,231 B1 | 8/2001 | Obradovich et al. | |
| 6,275,774 B1 | 8/2001 | Baron, Sr. et al. | |
| 6,282,464 B1 | 8/2001 | Obradovich | |
| 6,295,001 B1 | 9/2001 | Barber | |
| 6,295,346 B1 | 9/2001 | Markowitz et al. | |
| 6,295,492 B1 | 9/2001 | Lang et al. | |
| 6,304,816 B1 | 10/2001 | Berstis | |
| 6,311,060 B1 | 10/2001 | Evans et al. | |
| 6,323,803 B1 | 11/2001 | Jolley et al. | |
| 6,330,499 B1 | 12/2001 | Chou et al. | |
| 6,366,893 B2 | 4/2002 | Hannula et al. | |
| 6,377,825 B1 | 4/2002 | Kennedy et al. | |
| 6,405,033 B1 * | 6/2002 | Kennedy et al. | 455/445 |
| 6,424,912 B1 | 7/2002 | Correia et al. | |
| 6,463,462 B1 | 10/2002 | Smith et al. | |
| 6,466,796 B1 | 10/2002 | Jacobson et al. | |
| 6,480,699 B1 | 11/2002 | Lovoi | |
| 6,490,525 B2 | 12/2002 | Baron, Sr. et al. | |
| 6,493,633 B2 | 12/2002 | Baron, Sr. et al. | |
| 6,498,987 B1 | 12/2002 | Kelly et al. | |
| 6,498,989 B1 | 12/2002 | Pisetski et al. | |
| 6,505,123 B1 | 1/2003 | Root et al. | |
| 6,522,875 B1 | 2/2003 | Dowling et al. | |
| 6,522,977 B2 | 2/2003 | Corrigan et al. | |
| 6,526,268 B1 | 2/2003 | Marrah et al. | |
| 6,535,743 B1 | 3/2003 | Kennedy, III et al. | |
| 6,539,232 B2 | 3/2003 | Hendrey et al. | |
| 6,542,748 B2 | 4/2003 | Hendrey et al. | |
| 6,542,749 B2 | 4/2003 | Tanaka et al. | |
| 6,542,750 B2 | 4/2003 | Hendrey et al. | |
| 6,549,130 B1 | 4/2003 | Joao | |
| 6,590,529 B2 | 7/2003 | Schwoegler | |
| 6,603,405 B2 | 8/2003 | Smith | |
| 6,611,201 B1 | 8/2003 | Bishop et al. | |
| 6,618,593 B1 | 9/2003 | Drutman et al. | |
| 6,628,928 B1 | 9/2003 | Crosby et al. | |
| 6,646,559 B2 | 11/2003 | Smith | |
| 6,647,270 B1 | 11/2003 | Himmelstein | |
| 6,654,689 B1 | 11/2003 | Kelly et al. | |
| 6,678,516 B2 | 1/2004 | Nordman et al. | |
| 6,690,681 B1 | 2/2004 | Preston et al. | |
| 6,700,482 B2 | 3/2004 | Ververs et al. | |
| 6,711,474 B1 | 3/2004 | Treyz et al. | |
| 6,728,323 B1 | 4/2004 | Chen et al. | |
| 6,728,528 B1 | 4/2004 | Loke | |
| 6,745,021 B1 | 6/2004 | Stevens | |
| 6,748,318 B1 | 6/2004 | Jones | |
| 6,751,452 B1 | 6/2004 | Kupczyk et al. | |
| 6,754,485 B1 | 6/2004 | Obradovich et al. | |
| 6,754,585 B2 | 6/2004 | Root et al. | |
| 6,772,331 B1 | 8/2004 | Hind | |
| 6,812,860 B1 | 11/2004 | Schwarzwalder | |
| 6,816,878 B1 | 11/2004 | Zimmers et al. | |
| 6,819,919 B1 | 11/2004 | Tanaka | |
| 6,842,774 B1 | 1/2005 | Piccioni | |
| 6,853,849 B1 | 2/2005 | Taognazzini | |
| 6,915,126 B2 | 7/2005 | Mazzaro | |
| 7,062,379 B2 | 6/2006 | Videtich | |
| 7,092,723 B2 | 8/2006 | Himmelstein | |
| 7,123,926 B2 | 10/2006 | Himmelstein | |
| 7,155,335 B2 | 12/2006 | Rennels | |
| 7,174,253 B2 | 2/2007 | Videtich | |
| 7,216,145 B2 | 5/2007 | Collings, III | |
| 7,257,426 B1 | 8/2007 | Witkowski et al. | |
| 7,327,226 B2 * | 2/2008 | Turnbull et al. | 340/425.5 |
| 7,330,693 B1 | 2/2008 | Goss | |
| 7,450,955 B2 | 11/2008 | Himmelstein | |
| 7,463,896 B2 | 12/2008 | Himmelstein | |
| 7,505,772 B2 | 3/2009 | Himmelstein | |
| 2001/0044309 A1 | 11/2001 | Bar et al. | |
| 2001/0052847 A1 | 12/2001 | Auerbach | |
| 2002/0016171 A1 | 2/2002 | Doganata et al. | |
| 2002/0147766 A1 | 10/2002 | Vanska et al. | |
| 2002/0174073 A1 | 11/2002 | Nordman | |
| 2003/0169181 A1 | 9/2003 | Taylor | |
| 2003/0169185 A1 | 9/2003 | Taylor | |
| 2004/0002348 A1 | 1/2004 | Fracaroli | |
| 2004/0010591 A1 | 1/2004 | Sinn et al. | |
| 2004/0014457 A1 | 1/2004 | Stevens | |
| 2004/0067752 A1 | 4/2004 | Himmelstein | |
| 2004/0145459 A1 | 7/2004 | Himmelstein | |
| 2004/0162064 A1 | 8/2004 | Himmelstein | |
| 2004/0203931 A1 | 10/2004 | Karaoguz | |
| 2004/0248569 A1 | 12/2004 | Kondou et al. | |
| 2005/0021666 A1 | 1/2005 | Dinnage et al. | |

| | | |
|---|---|---|
| 2005/0233741 A1 | 10/2005 | Zamani |
| 2007/0054677 A1 | 3/2007 | Himmelstein |
| 2007/0082678 A1 | 4/2007 | Himmelstein |
| 2008/0119212 A1 | 5/2008 | Himmelstein |
| 2008/0146248 A1 | 6/2008 | Himmelstein |

OTHER PUBLICATIONS

Auerbach, Mitchell J., Emergency Management Communications System, U.S. Appl. No. 60/120,096, filed Feb. 16, 1999.

"Match.com Launches Match Mobile with AT&T Wireless," Match.com Corporate, Dec. 2003, (2 pgs).

"Match.com's Wireless Dating Service MatchMobile Launches Photo Profiles", Match.com Corporate, Dec. 2003, (2 pgs).

"Our Biggest Store: Organization Find People Nearby", AT&T Wireless, http://www.attwireless.com/personal/features/organization/findfriends.jhtml, Feb. 2004, (2 pgs).

AT&T Wireless, "Features and Services User Guide, How to Use Your AT&T Wireless Features and Services" (Feb. 6, 2004) (2pgs).

Selingo, "Protecting the Cellphone User's Right to Hide", The New York Times, nytimes.com, Feb. 5, 2004.

Yahoo Finance, "Private Inventor Files Patent Application for Telematics-Based Public and Emergency First Responders Safety Advisory System", Feb. 2004, http://biz.yahoo.com/p.

Wireless Services from AccuWeather.com, http://www.accuweather.com/iwxpage/adc/mobile/messenger.htm. Sep. 9, 2004 (2 pgs).

Press Release, "GM's OnStar Subsidiary Brings Location-Based, Real-Time Traffic and Road Condition Information Into The Vehicle," pp. 1-2, Nov. 13, 2000.

Specification of the Bluetooth System; Specification vol. 1; Wireless connections made easy; Core; v1.0 B; Dec. 1, 1999, (1082 pgs).

IEEE Std 802.11b-1999 (R2003); (Supplement to ANSI/IEEE Std 802.11, 1999 Edition), (96 pgs).

Ratliff, "The Telematics Options", Wired, Issue 7.07, The Dates is Apr. 28, 2008 http://www.wired.com/wired/archive/7.07/options.html, (4 pgs).

IEEE Std 802.11p; May 25, 2006, (4 pgs).

US 6,731,928, 05/2004, Tanaka (withdrawn)

* cited by examiner

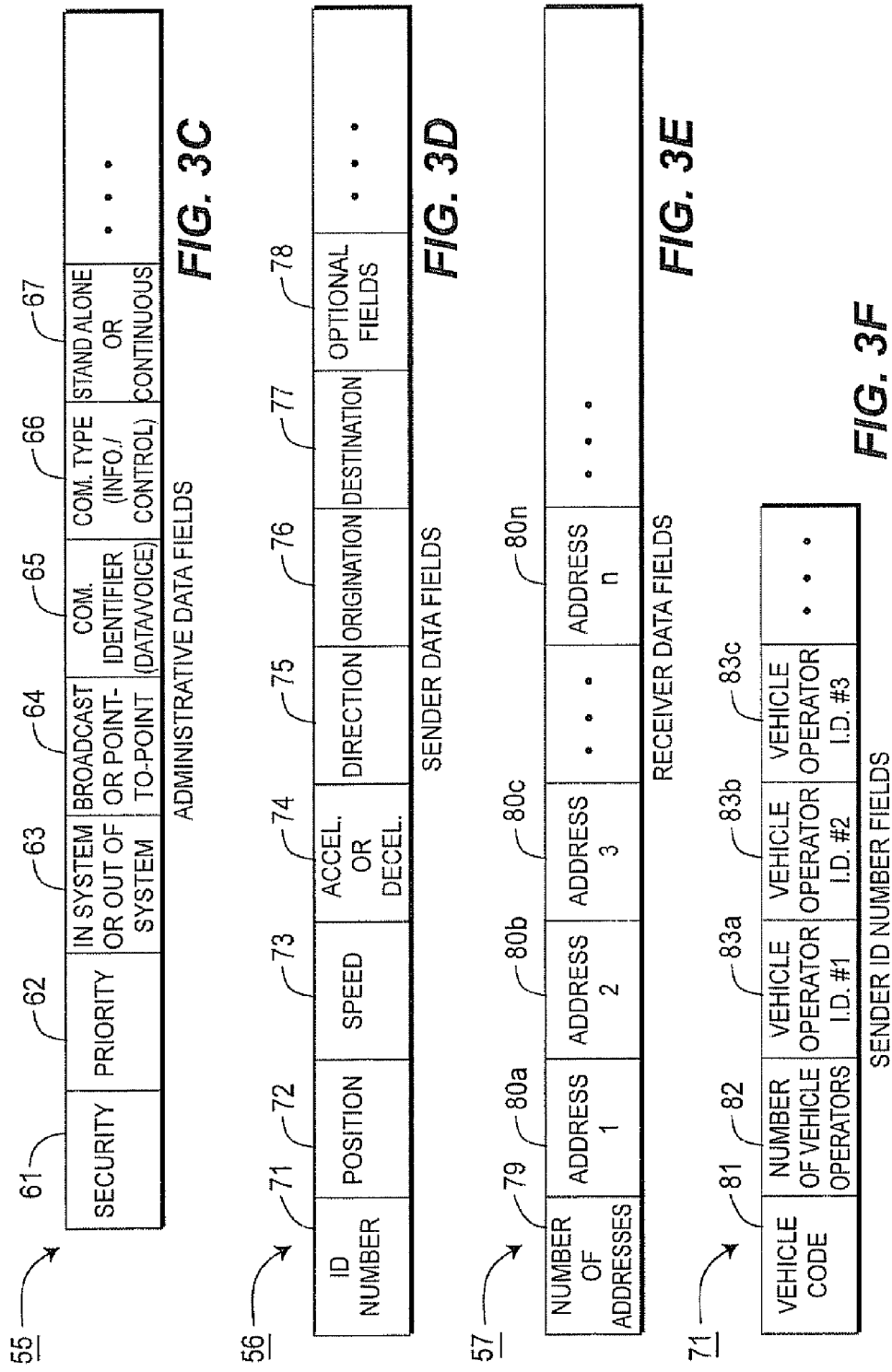

FIG. 4A

| | 90a | 90b | 90c | 90d | 90e | 90f |
|---|---|---|---|---|---|---|
| | TIME | DATE | POSITION | SPEED | ACC./DECEL. | DIRECTION |
| | 08:50 | 09/01/2000 | 42°34,18'31 | 65 | A | NNW |

| | 92a | 92b | 92c | 92d | 92e | 92f | 92g | 92h | 92i | 92j | 92k |
|---|---|---|---|---|---|---|---|---|---|---|---|
| | TIME | DATE | INCOMING/ OUTGOING | ADDRESSES | PRIORITY | BROADCAST/ POINT-TO-POINT | IN/OUT OF SYSTEM | SECURITY | DATA/ VOICE | INFO/ CONTROL | CONTENTS |
| | 08:52 | 09/01/2000 | I | 432967185 | 4 | B | I | 5 | V | I | TRAFFIC MESSAGE |
| | 12:08 | 09/01/2000 | I | 458341788 | 1 | P | I | 1 | D | C | REDUCE SPEED CONTROL INSTRUCTION |

92

SYSTEM AND METHOD FOR MATCHING WIRELESS DEVICES

CROSS REFERENCE TO RELATED APPLICATION

This application claims priority from U.S. application Ser. No. 12/018,588 filed Jan. 23, 2008 which is a continuation of U.S. application Ser. No. 11/524,858 filed Sep. 20, 2006, issued as U.S. Pat. No. 7,450,955 on Nov. 11, 2008, which is a continuation of U.S. application Ser. No. 10/705,674 filed Nov. 10, 2003, issued as U.S. Pat. No. 7,123,926 on Oct. 17, 2006, which was a continuation of U.S. application Ser. No. 09/659,074 filed Sep. 11, 2000, issued as U.S. Pat. No. 6,647,270 on Nov. 11, 2003, which in turn claims priority from U.S. Provisional Application No. 60/153,424 filed Sep. 10, 1999, all of which are incorporated by reference as if fully set forth herein.

BACKGROUND

The present invention generally relates to communication systems. More particularly, the invention relates to a mobile communication system which allows mobile vehicles to communicate with neighboring vehicles and roadside communication networks.

Various communication systems have been used by automobile drivers to communicate with other vehicles while the vehicle is in motion. While many advances have been made in vehicle to vehicle communication, numerous disadvantages still remain in using conventional communication systems.

Conventional mobile communication systems include cellular telephones and CB or two-way radio. When using a cell phone as a means of mobile communication, there is no practical way of discovering whether a neighboring vehicle operator possesses a cell phone. Additionally, there is no process for determining the phone number of the targeted cell phone. Accordingly, the cell phone as a communication medium is severely limited.

CB radio is a widely broadcast public medium where mobile users may talk to other mobile or stationary users in their vicinity. However, since there is no ability to prevent others from listening, there is no privacy between mobile communicators.

Automobile accidents are one of the greatest causes of serious injury and fatalities in society. Accordingly, the development of improved control and warning systems to minimize personal and financial losses resulting from automobile accidents is of utmost importance. The limitations of present forms of communication are even more severe when considering the extent to which a communication link can improve both the driving experience and the safety statistics of modern vehicles.

SUMMARY

According to a first aspect of the present application, a method is disclosed for providing a communication link between a mobile unit and a vehicle. The method comprises: receiving a communication link from a mobile unit; interfacing the communication link to a vehicle's electromechanical system; displaying via an audio-visual interface associated with the vehicle's electromechanical system the communication link; and transmitting a communication to the mobile unit.

According to a second aspect of the present application, a method is disclosed for providing a communication link between a cellular phone and a vehicle. The method comprises: receiving a communication link from a cellular phone; interfacing the communication link to a vehicle's electromechanical system; displaying via an audio-visual interface associated with the vehicle's electromechanical system the communication link; and transmitting a communication to the cellular phone.

According to a third aspect of the present application, a method is disclosed for providing a communication link between a cellular phone and a vehicle. The method comprises: receiving a communication link from a cellular phone; interfacing the communication link to a vehicle's electromechanical system; inputting via an audio-visual interface associated with the vehicle's electromechanical system a communication; and transmitting the communication to the cellular phone.

According to a fourth aspect of the present application, a method is disclosed for providing a communication link between a cellular phone and a remote unit. The method comprises: providing a communication link by a cellular phone; receiving a request for access to the communication link by a remote unit; connecting the remote unit to the communication link; and repeating a communication received by the cellular phone to the remote unit.

According to a fifth aspect of the present application, a vehicle is disclosed comprising: a transceiver for receiving a communication link from a cellular phone, the transceiver further for transmitting a communication to the cellular phone; an electromechanical system associated with the transceiver; and an audio-visual interface associated with the electromechanical system for displaying the communication link and for inputting the communication.

According to a sixth aspect of the present application, a vehicle is disclosed, comprising: a microprocessor; a transceiver associated with the microprocessor, the transceiver receiving a communication link from a mobile unit; a memory associated with the microprocessor, the memory storing a control instruction; an electromechanical system associated with the microprocessor, the electromechanical system exerting the control instruction; and an audio-visual interface associated with the electromechanical system, the audio-visual interface displaying the communication link.

BRIEF DESCRIPTION OF THE DRAWING(S)

FIG. 3C illustrates the information fields of the header's transmission administration.

FIG. 3D illustrates the information fields of the header's sender portion.

FIG. 3E illustrates the information fields of the header's receiver portion.

FIG. 3F illustrates the sub fields contained in the identification number field.

Figure 4C:
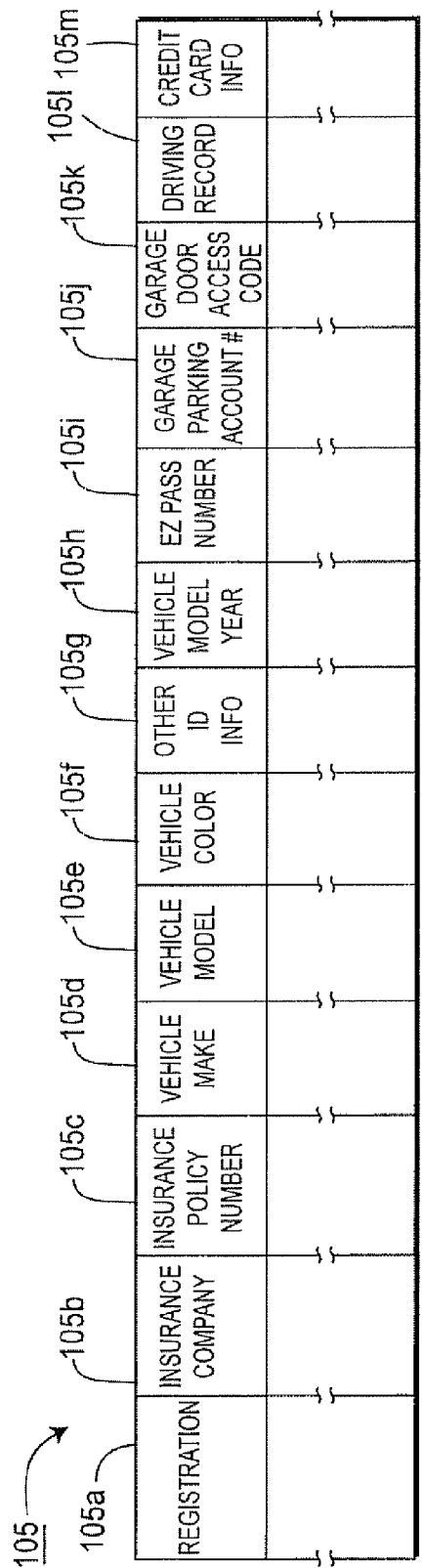
FIG. 4A illustrates the memory of the example mobile unit shown in FIG. 2.
Figure 4D:
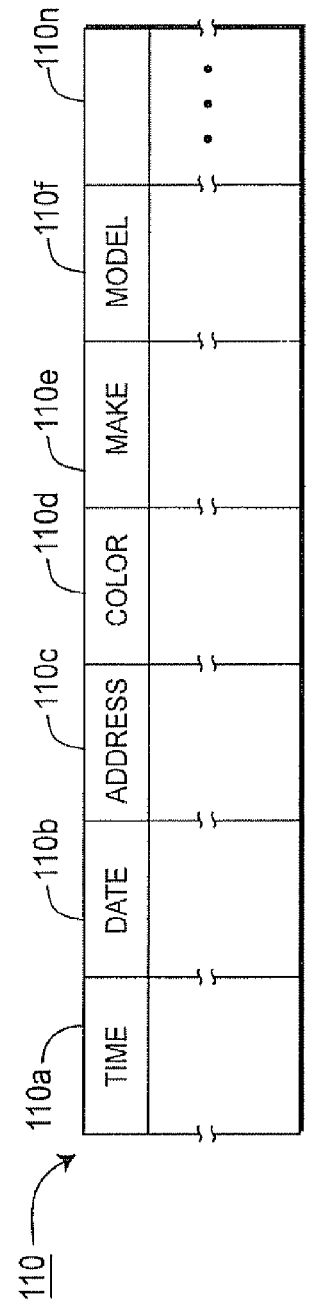

FIG. 4B is a diagram of a vehicle communication log. FIG. 4C is a diagram of a vehicle user log. FIG. 4D is a diagram of a vehicle contact log.

Figure 5:
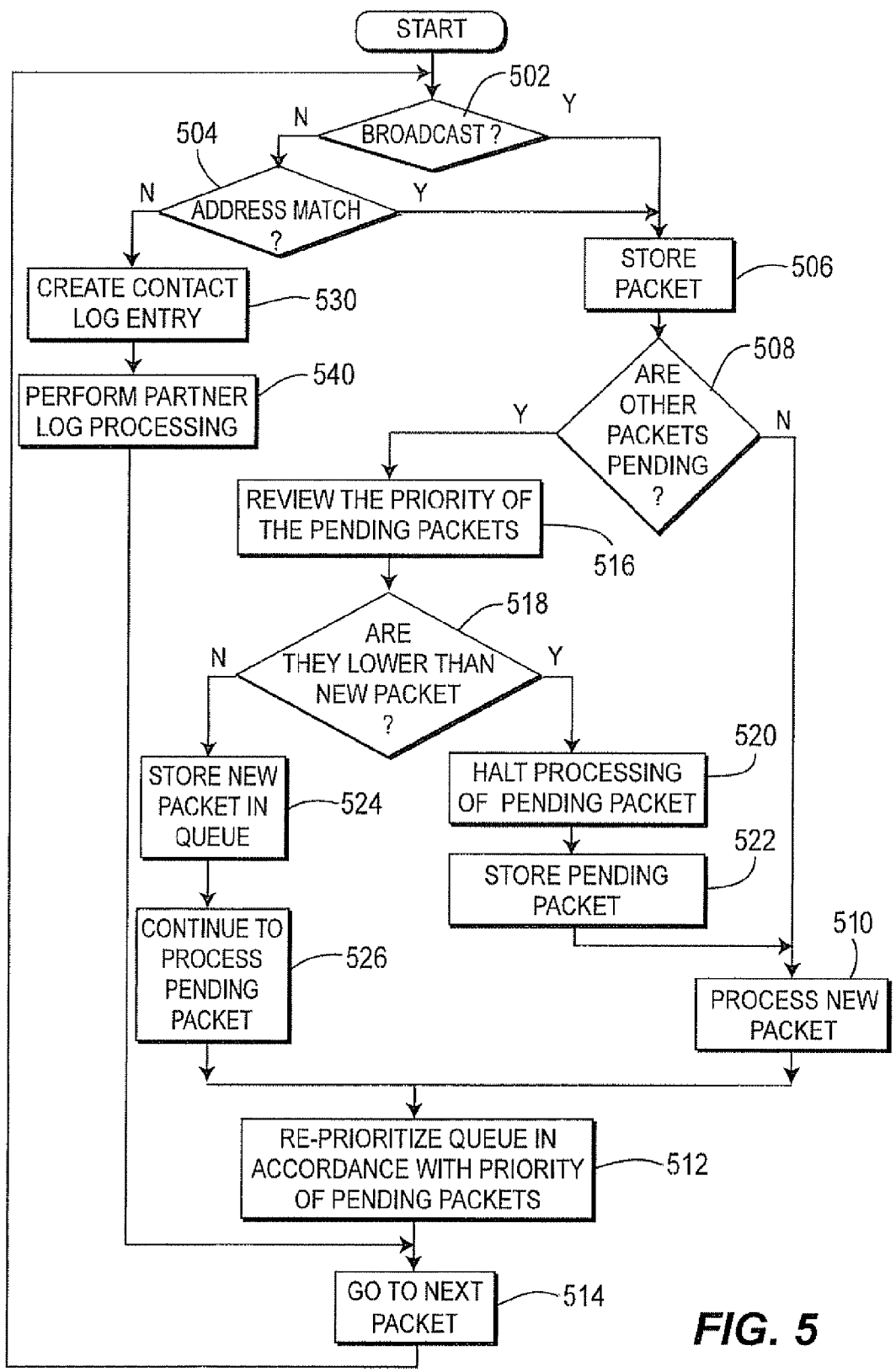

FIG. 5 is a flow diagram of the procedure utilized by the microprocessor upon receipt of a communication packet.

Figure 6:
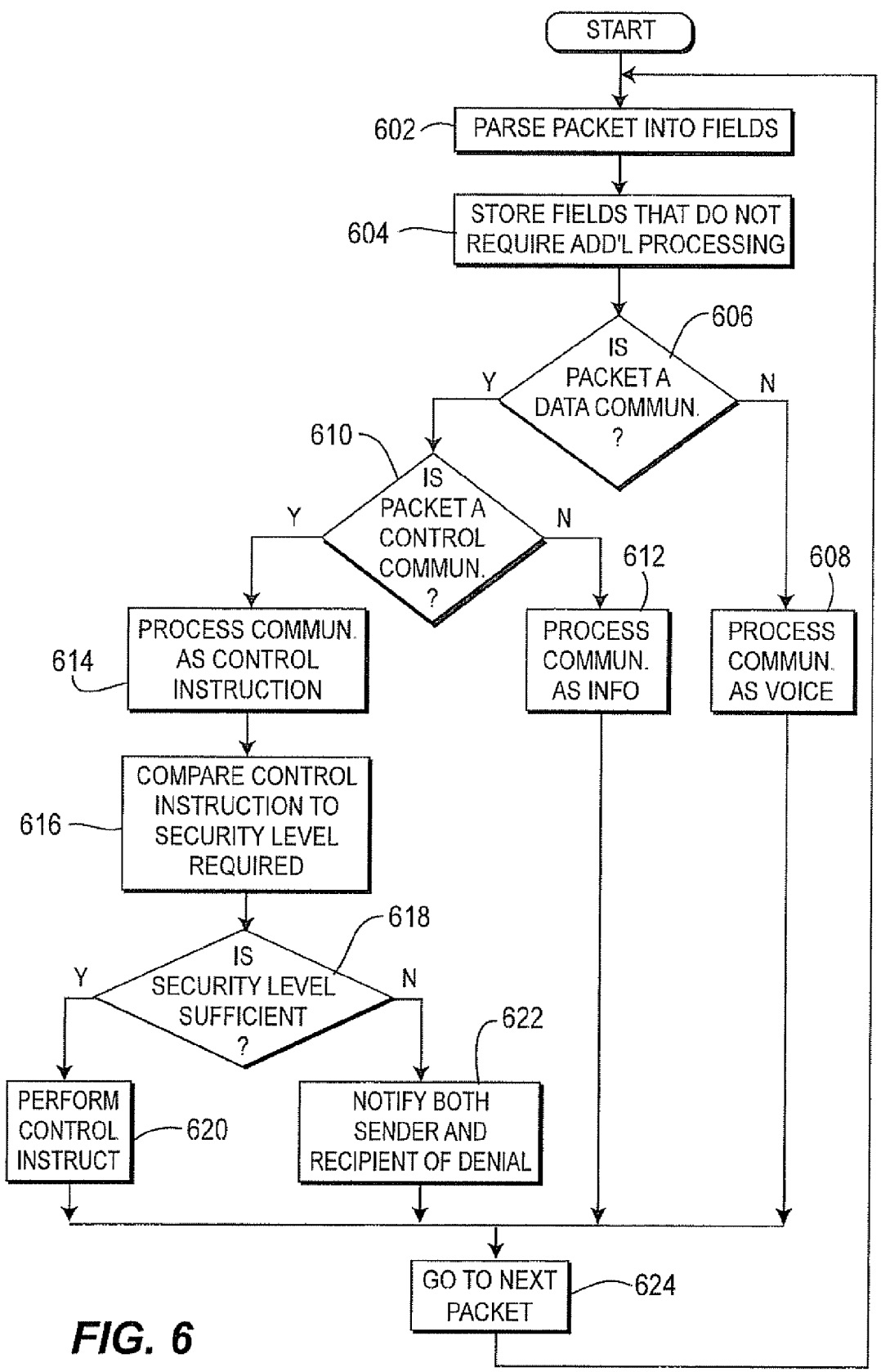

FIG. 6 is a flow diagram of the procedure for processing communication packets.

Figure 7:
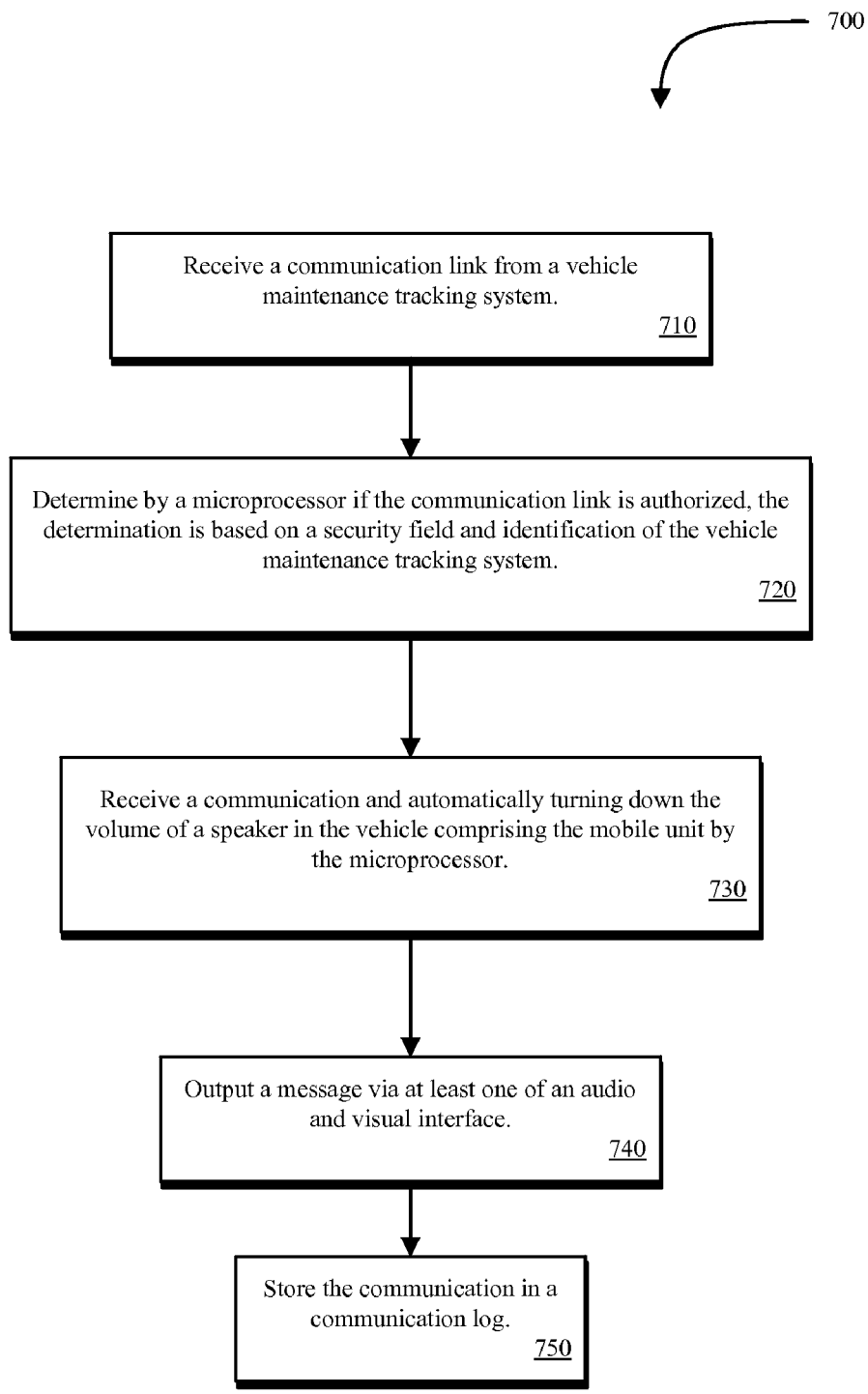

FIG. 7 is a flow diagram of an example method of wireless communication between a vehicle maintenance tracking system and a vehicle.

DETAILED DESCRIPTION

The present invention provides a communication link among vehicles which eliminates these pitfalls. The system comprises a broadband RF transceiver with antenna, a position determining means (such as a GPS receiver) an audio-visual interface, an electromechanical interface, and a microprocessor with associated memory. These components are incorporated into a mobile unit located within each vehicle.

The GPS receiver receives signals from GPS satellites and calculates the position of the vehicle. The microprocessor carries out overall control of the system. The memory includes identification information that is unique to each vehicle. In response to input from the GPS receiver, information received by the transceiver and instructions input by the vehicle operator via the audio-visual interface, the microprocessor determines the necessary subsequent actions.

The transmission from a vehicle may include information describing the status of the vehicle for use by the receiving vehicle. For example, the transmission may provide information regarding the speed, direction, and position of the transmitting vehicle. This information is received and processed by the receiving vehicle to provide a visual or audible display of the position, direction, and speed of the transmitting vehicle.

According to one aspect of the present invention, there is provided a communication system for transmitting information between a mobile unit within a vehicle traveling on a road and a fixed communication network installed on a roadside. The fixed communication network includes a base station having a transceiver for communicating with the vehicle by transmitting and receiving a plurality of communication packets. This communication can include payment instructions, security instructions, and/or access codes which can be transmitted with or without intervention by the vehicle operator.

An example embodiment will be described with reference to the drawing figures where identical numerals represent similar elements throughout.

Figure 1:
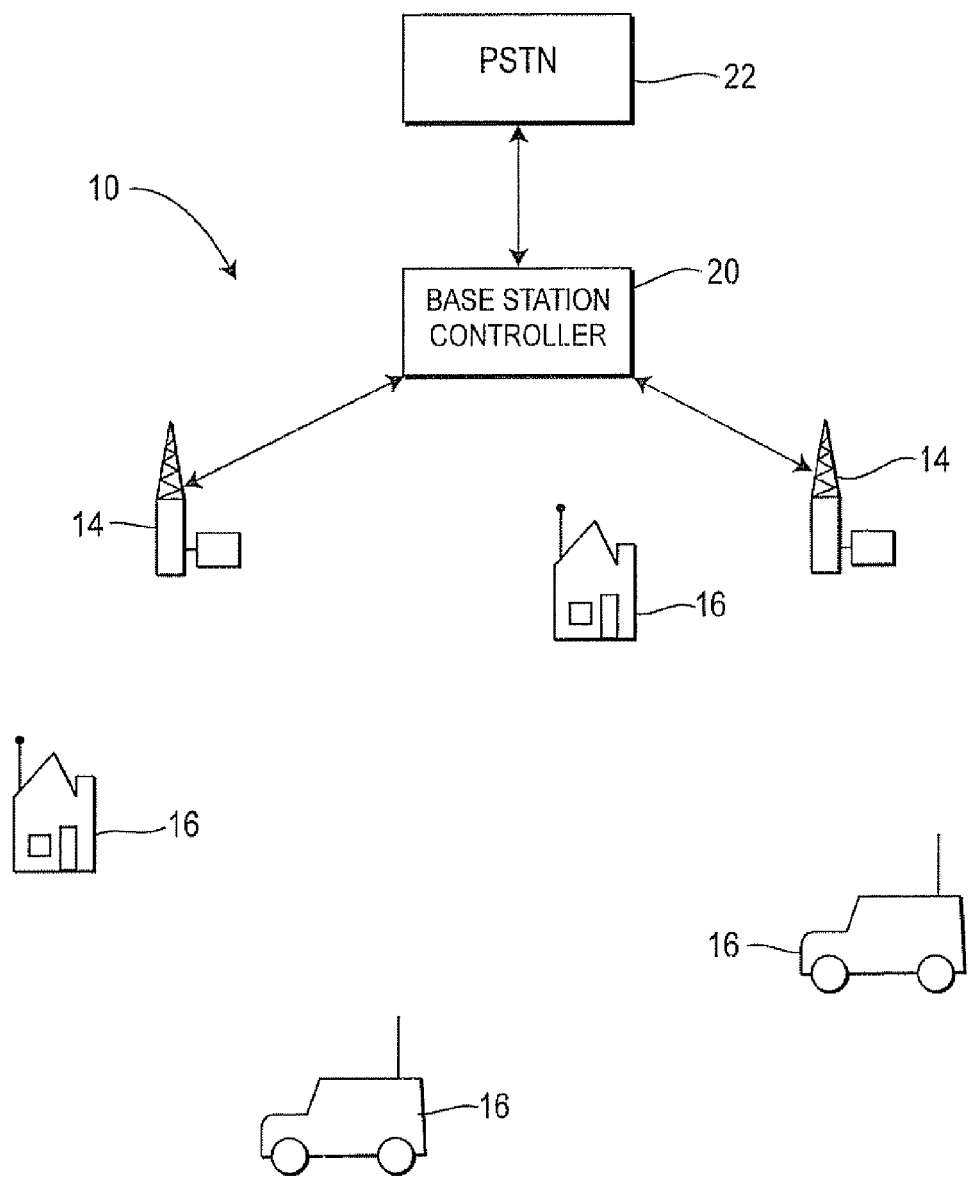
FIG. 1 shows an example vehicle communication system.

A vehicle communication system embodying the present invention is shown in FIG. 1. The vehicle communication system 10 generally includes one or more base stations 14, each of which is in wireless communication with a plurality of remote units 16. Although the remote units 16 may be fixed or mobile, they will be referred to hereinafter for simplicity as mobile units 16. Each mobile unit 16 can communicate with another mobile unit 16, the closest base station 14, or the base station 14 which provides the strongest communication signal. The base station 14 communicates with a base station controller 20, which coordinates communications among base stations 14 and mobile units 16. The communication system 10 may be connected to a public switched telephone network ("PSTN") 22, wherein the base station controller 20 also coordinates communications between the base stations 14 and the PSTN 22. In the example embodiment, each base station 14, communicates with the base station controller 20 over a wireless link, although a land line may also be provided. A land line is particularly applicable when a base station 14 is in close proximity to the base station controller 20. The fixed remote units 16 may also communicate with a base station 14 over a land line.

The base station controller 20 performs several functions. Primarily, the base station controller 20 provides all of the operations, administrative, and maintenance ("OA&M") signaling associated with establishing and maintaining all of the wireless communications between the mobile units 16, the base stations 14, and the base station controller 20. The base station controller 20 can provide the routing of all communications between mobile units 16, and between the mobile units 16 and the PSTN 22. The base station controller 20 also provides an interface between the mobile units 16 and the PSTN 22. This interface includes multiplexing and demultiplexing of the communication signals that enter and leave the system 10 via the base station controller 20. Although the vehicle communication system 10 is shown employing antennas to transmit radio frequency ("RF") signals, one skilled in the art should recognize that communications may be accomplished via microwave or satellite uplinks. Additionally, the functions of the base station controller 20 may be combined with a base station 14 to form a "master base station."

Figure 2:
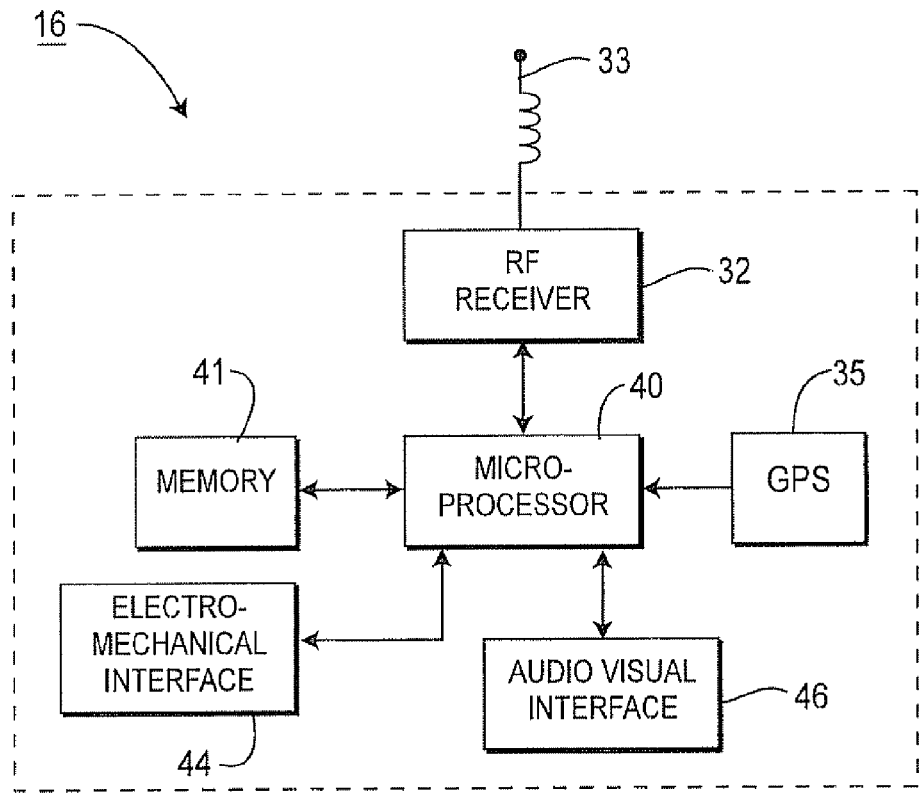
FIG. 2 is a block diagram showing a mobile unit in accordance with the example embodiment.

An example embodiment of the mobile unit 16 is shown in FIG. 2. Each mobile unit includes an RF transceiver 32 with an antenna 33 capable of transmitting and receiving a plurality of RF signals, a global positioning system ("GPS") receiver 35, a microprocessor 40 with associated memory 41, an interface to the vehicle's electromechanical systems 44, and an audiovisual interface 46.

The RF transceiver 32 transmits and receives RF signals at a plurality of RF frequencies to one or more vehicles which include a mobile unit 16. Received signals are downloaded to baseband and forwarded to the microprocessor 40 for further processing. Transmitted signals are forwarded from the microprocessor 40 to the RF transceiver 32 for upconversion and transmission over one of the plurality of RF frequencies. The vehicle communication system 10 also provides for the option of transmitting a communication over currently licensed radio station channels, for example 105.9 FM. This can permit mobile unit operator to broadcast to non-mobile unit operators. It also can provide a "scanning channel", such that non-mobile unit operators can listen to broadcast communications.

The GPS receiver 35 is configured to receive signals from GPS satellites and compute the position of the mobile unit 16. There are many commercially available GPS receivers 35 that can perform such a function. GPS readings which are provided to the microprocessor 40 permit the microprocessor 40 to accurately calculate the speed, direction, and acceleration or deceleration rate of the vehicle.

The microprocessor 40 provides central control of the mobile unit 16. As will be explained in greater detail hereinafter, the microprocessor 40 also performs packet handling, including packet assembling for outgoing communication packets 50 and packet disassembling for incoming communication packets 50 received from the RF transceiver 32. Communication packets 50 received by the microprocessor 40 are stored in memory 41. The memory 41 is also used to store identification information that is unique to each vehicle and/or vehicle operator. For example, license and registration for each vehicle can be read if positioned with a bar code or magnetic strip in a specific location of the vehicle. Optionally, the system may have a card reader where the operator must place their card prior to the vehicle starting. This card can be a license with a magnetic strip or a smartcard that identifies the driver and the vehicle. This unique information regarding the vehicle may also include the position of the vehicle, speed of the vehicle and rate of acceleration or deceleration as calculated by data obtained from the GPS receiver 35.

The audio-visual interface ("AVI") 46 may comprise a microphone, speakers, and graphic display along with alphanumeric and directional keypads. However, those of skill in the art should realize that the AVI 46 may encompass other input devices which are known, such as a voice activated input unit, an infrared ("IR") remote control, a full keyboard or any other type of electronic or manual data input means. Additionally, the output portion of the AVI 46 may include any type of output means such as a stereo system or a heads-up display.

The electromechanical interface 44 provides an electrical coupling to the electromechanical systems of the vehicle over which the mobile unit 16 has control. These systems may include the radio, lights, horn, windows, locks, steering, braking, and any other electromechanical systems of the vehicle.

Figure 3A:
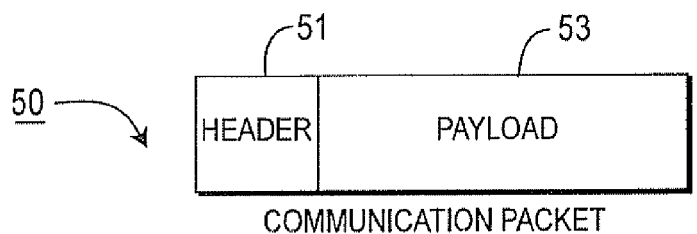
FIG. 3A is a diagram illustrating the contents of a communication packet transmitted by the mobile unit shown in FIG. 2.

Communications between mobile units 16 using the vehicle communication system 10 are accomplished through a stream of transmitted communication packets 50. As shown in FIG. 3A, each communication packet 50 includes a header 51 and a payload 53. The header 51 includes a plurality of predefined information fields which provide information regarding the particular communication, the sender which originated the communication, and the receiver to which the communication is destined. It should be recognized that a voice or data communication may be segmented or "packetized" and transmitted using a plurality of packets 50. The present invention is not restricted to transmitting a communication having a predefined length. Accordingly, the payload 53 may include only a portion of the communication that is sent between mobile units 16, and a single communication may be sent using a plurality of packets 50. Communications may include data transmissions, such as uploads from the mobile unit 16, downloads to the mobile unit 16, or voice communications.

Figure 3B:
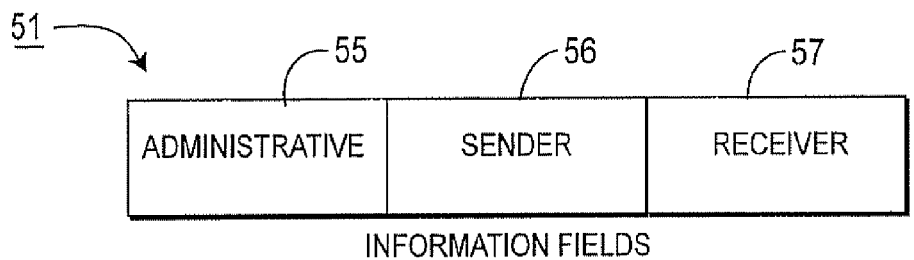
FIG. 3B illustrates the header of the communication packet.

Referring to FIG. 3B, the header 51 includes a plurality of information fields which can be generally categorized by three different functional groups: 1) transmission administrative information 55; 2) sender information 56; and 3) receiver information 57. These fields will be explained in greater detail hereinafter.

Referring to FIG. 3C, the information fields associated with the transmission administration 55 are shown. These fields provide information that defines the particular communication being transmitted. Although the number of fields vary, and the type of fields described may change depending on the particular communication and the requirements of the system 10, in one embodiment of the present application, the fields associated with transmission administration 55 include, the following fields: security 61; priority 62; in system/out of system 63; broadcast/point-to-point 64; communication identifier (data/voice) 65; communication type (information/control) 66; and communication length (standalone or continuous) 67.

Since the vehicle communication system 10 in accordance with the present invention permits control of a vehicle and overall control of the communication system 10 by law enforcement authorities via a "security instruction", the system 10 has a plurality of security levels to ensure that unauthorized individuals will not use the system 10 for subversive purposes. Optionally, driver may override law enforcement. The system 10 may ask for permission for law enforcement to control vehicle. The security field 61 is defined as follows:

0—Access to all functions of the vehicle communication system 10, including the physical control of the vehicle and all of the information stored within the memory 41.

1—Access only to the physical control of the vehicle.

2—Access only to the information stored within the memory 41.

3—Access for transmitting and receiving communications.

4—Access only to receiving communications.

The security field 61 may also include a security code, which permits authentication of the entity sending the security instruction. As aforementioned, it should be understood by those skilled in the art that additional fields may be added or defined as desired to increase the functionality of the system 10 or the security layers. Additionally, it should be recognized that although the system 10 is capable of a broad range of functionality, there are legal implications to implementing all of the functionality. For example, a court order would most likely be necessary before permitting law enforcement officials access to information in, or control of, the mobile unit 16.

The priority field 62 is an indicator of the urgency of the transmitted communication. The priority field 62 can be a numeric priority from one to ten; with urgent communications having the highest priority of one (e.g., communications from law enforcement officials) and non-urgent communications having the lowest priority of ten (e.g., advertisements).

The in system/out of system field 63 indicates whether the communication is destined for, or originated from, another mobile unit 16 or an entity located outside of the vehicle communication system 10. Communications with entities outside the vehicle communication system 10 can be routed between the mobile unit 16 and the outside entity over the PSTN 22.

The broadcast/point-to-point field 64 identifies whether the message is intended for broadcast to all mobile units 16 or whether it is intended to be routed to a particular mobile unit 16. As will be explained in detail hereinafter, the receiver field 57 will specify the particular address, or multiple addresses, of the mobile units 16 to which the communication will be transmitted.

The communication identifier field 65 identifies whether the communication is a voice or data transmission since each transmission may be encoded and processed differently by the receiving microprocessor 40.

The communication type field 66 identifies whether the communication comprises information for output to the user via the AVI 46, or whether the information is a control instruction that will permit electromechanical control of the vehicle.

The communication length field 67 indicates whether the entire communication is included within the current packet 50, or whether the packet 50 is part of a multi-packet communication.

Referring to FIG. 3D, the fields associated with the sender portion 56 of the header 51 include identification number 71, position 72, speed 73, acceleration or deceleration 74, direction 75, origination 76, and destination 77, and may include additional optional fields 78 as specified by the vehicle operator.

The identification number 71 provides a unique identification for the sending mobile unit 16. The identification number may be the vehicle license number with two additional letters representing the state where the license plate was issued, such as PA for Pennsylvania. Depending upon system administration, the identification number 71 may further relate to one or more individual operators of the vehicle. As shown in FIG. 3F, the identification number field 71 may include a plurality of subfields including vehicle code 81, number of authorized vehicle operators 82, and a vehicle operator identification number 83$_{a, b \ldots n}$ for each operator. This feature is particularly useful if the vehicle is part of a commercial fleet of vehicles with multiple drivers. Upon turning on the vehicle, the vehicle operator inputs their identification number 71. This number 71 is compared to the list of authorized operators previously stored in memory 41. If the input operator identification number 71 matches favorably with one of the authorized operators previously stored in memory 41, operation of the vehicle is permitted; if not, operation is denied. Optionally, license plate, registration, insurance information and driver's license information can be additional fields stored with the identification number 71.

Use of a vehicle operator identification number 71, such as a driver's license, also permits different operators to use the vehicle while retaining their distinct identity and storing information particular to that vehicle operator, similar to a screen name for Internet use such as the America Online ("AOL") system.

Referring back to FIG. 3D, the next four fields associated with the sender portion 56 of the header 51 include position 72, speed 73, acceleration or deceleration 74, and direction 75, which are automatically created from the information obtained from the sender's GPS receiver 35.

The origination field 76 includes the location of the vehicle when the vehicle was turned on. The destination field 77 includes the destination of the vehicle. This, of course, requires that the destination be input into the mobile unit 16, such as when a destination is input into a navigation system. It should be understood that the mobile unit operator may override certain fields to ensure that this information is not obtained by other mobile unit operators. For example, the origination 76 and destination fields 77, which may include personal information that the mobile unit operator does not desire other mobile unit operators to have access to, may include null data such that the sender's destination and origination will be listed as "not available" to the receiver. The vehicle operator configures their mobile unit 16 as desired to specify which fields should be transmitted with null data.

Referring to FIG. 3E, the fields associated with the receiver portion 56 of the header 51 are shown in greater detail. As discussed with reference to FIG. 3C, the broadcast or point-to-point field 64 indicates whether the communication is destined for one, multiple, or all operators. If the communication is to be broadcast to all mobile unit operators, the number of addressees field 79 is designated as zero indicating that all operators will receive the communication. For point-to-point or point-to-multipoint communications, (whereby a plurality of operators may be included within a conversation or communication), the number of addressees field 79 includes the number of operators which will be receiving the communication. For example, if a point-to-point communication is desired, the number of addressees field 79 will include the number one (1) and address field number one 80a will be the only field which includes an address. If a point-to-multipoint communication is desired between, for example four additional mobile unit operators, the number of addresses field 79 will include the number four (4) and address fields one through four 80a-d will include the addresses of the four receivers to be sent the communication.

Once all of the aforementioned fields have been populated with the information, the microprocessor 40 builds each communication packet 50 and forwards the packet 50 to the transceiver 32 for transmission. The packets 50 are preferably transmitted to the base station 14, and then forwarded to the base station controller 20. The base station controller 20 routes all of the communication packets 50 to the specified addresses, either to one or more mobile unit operators, one or more outside entities, or both. This routing function is the same as an Internet router, whereby the destination address or addresses are read by the router and the communication packet 50 is forwarded to those addresses. If the communication packet 50 is to be forwarded to multiple addresses or broadcast to all addresses, the base station controller 20 provides such a routing function.

The base station controller 20 may also confirm to sender whether or not a signal has been received by the recipient. In an alternative embodiment, each communication may require a confirmation packet be sent from the recipient to the sender to provide the confirmation. Using such an embodiment, the sending mobile unit operator will know whether or not the communication packet 50 has reached its destination.

Although the present invention has been explained with reference to a plurality of base stations 14 and a base station controller 20, the system 10 can also use technology similar to Bluetooth wireless technology. Using technology such as Bluetooth allows mobile units and base stations to communicate through other mobile units and base units (i.e., repeaters). This permits a wireless interconnect between mobile devices, and between mobile devices and their peripherals. The mobile devices can form a secure piconet and communicate among the connected devices. Accordingly, using this technology, mobile units 16 can talk directly to other mobile units 16 without the intervention of the base stations 14 and the base station controller 20.

It is intended that the present invention be used with any type of wireless communication standard including Bluetooth or other wireless or data transmission standard. The particular standard used in transmitting the data is not critical since there are many types of wireless technologies and standards that can be used to transfer information between mobile units 16. It should be recognized that any of the communications could be encrypted by currently known technologies so that only certain authorized mobile units can communicate with each other. For example, if two users were communicating with one another and either requested a private conversation, the system can immediately encrypt their communication.

As should be understood by those of skill in the art, if the address of the receiver is outside of the system 10 and must be routed via the PSTN 22, the base station controller 20 formats the communication packet 50 in a format that may be handled by the PST N 22. Although the present invention has been explained using a general packet 50 "structure" as illustrated by FIGS. 3A-3F, this structure is intended to serve as an example of the information to be transmitted by the system 10 in each communication. It is not the intention herein to specify a new communication standard, since the present invention may be utilized with any current or future wireless communication standard. For example, the packets 50 transmitted over the vehicle communication system 10 may use the Internet Protocol (JP) format, such that they may be transmitted seamlessly to any communication system which uses the IP format. The discussion of the particular format and/or conversion to another format for forwarding over the PSTN 22 is outside the scope of the present invention.

As shown in FIGS. 4A and 4B, the memory 41 is used to store information which populates the aforementioned fields. As will be described in greater detail hereinafter with reference to FIG. 4C, the memory 41 is also used to store other detailed information which may be helpful to the mobile unit operator, other mobile unit operators, the base station controller 20, or law enforcement agencies. The information stored in memory 41 may originate from a received communication, or may be input into the mobile unit via the AVI 46.

For example, information that is specific to a particular operator, such as those fields illustrated in FIG. 4C, may be input by the mobile unit operator via the AVI 46.

Referring to FIG. 4A, one of the uses of the memory 41 is to automatically store a current vehicle activity log 90 and previously entered logs. The vehicle activity log 90 includes a plurality of fields including the time 90a, date 90b, position 90c, speed 90d, acceleration/deceleration 90e, and direction 90f of the vehicle. This log 90 is updated on a periodic basis as determined by the mobile unit operator. For example, private individuals may desire the log 90 to be updated every 15 minutes whereas commercial businesses may require the log 90 to be updated every 15 seconds or even less. It should be realized that the vehicle activity log 90, if updated on the order of fractions of a second, would be extremely useful during accident reconstruction.

Referring to FIG. 4B, a vehicle communication log 92 is shown. The communication log 92 includes the following fields: the time of the communication 92a; the date of the communication 92b; an indication of whether the communication was incoming or outgoing 92c; the addresses) of the communicating entity 92d; the priority of the communication 92e; an indication of whether the communication is broadcast or point-to-point 92f; an indication of whether the communicating entity is within the system or outside the system 92g; the security level of the communicating entity 92h; an indication of whether the communication is data or voice 92i; an indication of whether the communication is information or control 92j; and the actual contents of the communication 92k. The vehicle communication log 92 continually tracks each ongoing communication and stores the contents of the communication in the contents field 92k and all of the related information in the remaining fields 92a-j.

Referring to FIG. 4C, a operator may input via the AVI 46 a plurality of fields related to the specific user and/or vehicle in a user log 105. One example of a user log 105 is shown in FIG. 4C which includes the following fields: registration number 105a; insurance company 105b; insurance policy number 105c; vehicle make 105d; vehicle model 105e; vehicle color 105f; other identifying information 105g; vehicle model year 105h; EZpass number 105i; garage parking account number 105j; garage door access code 105k; driving record 105l; and credit card information 105m. There is no limit to the number of fields which may be stored in the user log 105, and all fields can be defined by the mobile unit operator. Since many of these fields include sensitive information, the mobile unit operator may decide not to send any information from the user log 105 and the microprocessor 40, when constructing the data packets, will place null data in those fields.

The procedure utilized by the microprocessor 40 upon receipt of a communication packet 50 is shown in FIG. 5. The microprocessor 40 first determines whether the incoming packet 50 is addressed to the specific mobile unit 16. Accordingly, at step 502, the microprocessor determines whether the incoming packet is a broadcast, and at step 504, the microprocessor determines whether the specific address matches the mobile unit address. If either of these determinations is affirmative, the new packet is stored (step 506). The microprocessor then determines if there are other communication packets pending for processing (step 508). If no other packets are pending, the new packet is processed (step 510). If applicable, any packets in the queue are reprioritized in accordance with the priority of each packet (step 512) which, in the case where no other packets are pending, would not be necessary. The microprocessor then goes on to reviewing the next packet step (514).

If it has been determined in step 508 that other packets are pending, the priority of all of the pending packets are reviewed (step 516) and a determination is made (step 518) whether the pending packets have a lower priority than the new packet. If the new packet has a higher priority then the pending packets, the microprocessor halts processing of the pending packet currently being processed (step 520), restores the pending packet into memory (step 522), and proceeds with processing the new packet (step 510).

If, however, the pending packets do not have a lower priority than the new packet, the microprocessor stores the new packet in a queue with all other pending packets (step 524) and continues to process the pending packet (step 526). In this manner, the microprocessor 40 is able to process higher priority packets first, and delay processing of lower priority packets to a more appropriate time when the microprocessor has the proper resources.

Optionally, even if the microprocessor determines in steps 502 and 504 that the communication is not addressed to the particular mobile unit 16, either as point-to-point communication or as part of a broadcast communication, the microprocessor may still undertake minimal processing of such packets. This is performed in step 530 whereby a contact log is created.

As shown in FIG. 4D, the contact log 110 may include a minimum number of fields such as the time 110x, date 110b, address 110c, color 110d, make 110e, and model 110f of the vehicle related to the incoming communication packet 50. The number and type of fields is determined by the mobile unit operator. The payload of the packet may not be stored. The contact log 110 is used by the microprocessor 40 to search for "matches" with other mobile unit operators. Upon request by the mobile unit operator, the microprocessor 40 searches the contact log 110 for any addresses (i.e., sending addresses) that have multiple entries in the log 110. Once the microprocessor 40 searches the contact log 110 and outputs the addresses which show up on the contact log 110 greater than a certain frequency threshold as set by the mobile unit operator, the operator can determine whether those addresses should be placed in a "commuter" log; which is a list of mobile unit operators as identified by their addresses.

This information is provided to the mobile unit operator via the AVI 46. This permits the operator to identify, either graphically as located on a real-time map or via a list, other mobile unit operators which may be in the vicinity during a certain portion of the day. For example, during a commute to work if other mobile unit operators are typically within the vicinity of the present mobile unit operator during a certain time of day, a "partner log" may be created by each mobile unit operator to permit mobile unit operators to identify, contact, and establish a rapport with other mobile unit operators.

Since the communication packet headers 51 include detailed information about other mobile units 16, the system 10 can provide flexibility in contacting other mobile unit operators in the vicinity. For example, if a mobile unit operator observes a vehicle that they would like to establish a private conversation with, the operator may command the mobile unit 16 to "talk" to the blue car. If more than one mobile unit 16 is in a blue car in the vicinity, the microprocessor 40 can filter the commuter log to vehicles having the color blue. If more than one blue car was in the vicinity, the microprocessor 40 presents the make and model of each blue car and requests further instructions.

Since all of the detailed information is available in the packet header 51, the system 10 can provide the speed, direction, and location of the other vehicle in relation to the present vehicle. This information is also important in order to evaluate whether another mobile unit 16 will be available for a conversation having a duration of a minimum length. For example, if a mobile unit operator notes that one of the operators on his partner log is currently traveling in the vicinity, and the mobile unit operator would like to establish communications with the other mobile unit operator, the system 10 can calculate the duration of a potential conversation based upon the speed and direction of both vehicles and their ultimate destinations, if available. The system 10 can combine that information and advise both mobile unit operators by an audible alarm or a voice message that there is a certain amount of time left in the conversation. The microprocessor 40 can also filter out any mobile units 16 that will not be in the range long enough to establish a reasonable conversation.

At step 540, the microprocessor 40 reviews all incoming communication packets 50 to determine if a particular communication packet 50 originates from an address that is on the operator's partner log. As the communication packets 50 are reviewed at step 540, the mobile unit operator is notified and can decide whether or not they want to establish a communication with the particular mobile unit operator having the address that has compared favorably with the partner log. It should be noted that mobile unit operators can block out transmissions being received from particular individuals or cancel conversations at anytime. Further, mobile unit operators can require information such as drivers license, license plate, and registration to be provided before they allow any other transmissions to be received.

Referring to FIG. 6, the procedure for processing communication packets 50 by the microprocessor 40 is shown. The microprocessor first parses the packets into separate fields (step 602) and stores all of the fields that do not require additional processing (step 604). The microprocessor then determines whether a packet includes a data communication by viewing the communication identifier field (step 606). If the microprocessor determines that the packet is not carrying a data communication, then it is a voice communication and the microprocessor processes the communication as such (step 608).

If the packet includes a data communication, the microprocessor must make a determination whether the data communication is a control communication (step 610). If it is not a control communication, the data communication is an information communication and it is processed as such (step 612). Examples of packets which include information communications include audio, visual, and text files that are downloaded over the Internet, facsimile transmissions, and transmissions from peripheral devices such as laptop computers, handheld devices, and the like.

If it has been determined that the packet includes a control communication, the communication is processed as such (step 614). The microprocessor compares the control instruction to the security level required (step 616). This includes reviewing the security field, including the optional security access code. If the security access code is proper (i.e., authorized), the security level is reviewed and the microprocessor makes a determination of whether the security level is sufficient (step 618). If so, the microprocessor performs the control instruction (step 620). If not, the microprocessor generates a transmission to the sender of the control instruction that they are not authorized to control the particular mobile unit (step 622). The microprocessor 40 also notifies the particular mobile unit operator that a control attempt was made and was unsuccessful. This will alert the mobile unit operator that someone may be utilizing the system for subversive purposes. Optionally, the system may require the mobile unit operator to authorize their vehicle to accept a control instruction, prior to undertaking any control instructions. Once the processing of the packet is performed, the microprocessor goes to the next packet (step 624).

With respect to the step of performing a control instruction (step 620), this may include instructions for the microprocessor to exert electromechanical control over certain aspects of the vehicle's operation, or may simply include a request for the microprocessor to upload data to the recipient. For example, if the control instruction is a request for the microprocessor to upload information, the microprocessor may upload one or a plurality of the fields shown in FIG. 4C.

In a first example relating to a request for information, if the vehicle is entering a toll booth which utilizes the EZpass system, the control instruction from the transmitting toll booth may request that the EZpass number be transmitted. The microprocessor 40 will transmit the number in the EZpass number field shown in FIG. 4C in response thereto.

In a second example relating to a request for information, a request for information may occur in a parking garage, gas station, or any other establishment which requires payment from the vehicle operator, such as a drive-in fast-food restaurant. In this example, the vehicle operator will drive up to an ordering kiosk and order the desired food. After the food has been ordered, the driver pulls up to the window whereby the proper food order is presented to the driver. Meanwhile, the restaurant's communication system sends a communication requesting the credit card information for billing purposes. The information shown in the credit card so information field 105u, of FIG. 4C can then be presented to the communication system of the restaurant for payment. Optionally, the mobile unit operator may require that they must first approve of any information being released. Moreover, the communication log for both the fast-food restaurant and the vehicle may store the communication noting the charge amount. For the vehicle it can be a "virtual receipt".

With respect to an instruction which exerts electromechanical control over the vehicle, as shown in FIG. 2, the electromechanical interface 44 will interface with those systems of the vehicle over which the mobile unit 16 has control. These systems may include the radio, lights, horn, steering, braking, and any other electromechanical systems of the vehicle. For example, if a mobile unit operator is listening to their favorite radio station and a point-to-point or broadcast communication is received by the mobile unit 16, the microprocessor 40 through the electromechanical interface 44 will stop the radio, or turn down the volume of the radio, so that a conversation can commence.

It should be understood that due to the amount of information set forth in the header 51 of each communication packet 50, the system 10 provides flexibility in processing and filtering communications. For example, the microprocessor 40 can be programmed to accept only communications from certain makes and models of vehicles. As such, the system 10 set up as part of a Mercedes can be programmed by the manufacturer to be able to talk to only other Mercedes operators.

The present invention has the ability to increase safety to drivers and can be a valuable resource for emergency services personnel and a law enforcement personnel. For example, emergency vehicles can automatically send signals to warn motorists that an emergency vehicle is approaching. This may supplement the emergency light and siren which are standard on emergency vehicles. Since the packets 50 are prioritized, a communication sent from an emergency vehicle in transit may have the highest priority and can override all other signals having a lower priority. At the scene of an accident, the signal output from an emergency vehicle may, at a slightly lower priority, transmit instructions for avoiding the accident scene and may provide detour instructions.

With respect to motor vehicle code enforcement, law enforcement agencies can automatically review the status of a driver, vehicle registration, and insurance and may provide warnings for expired or soon to be expired license, registrations, or insurance policies.

If an unauthorized operator has gained access to the vehicle and has not input the proper operator identification number, the microprocessor 40 can transmit an emergency instruction to alert law enforcement agencies that the vehicle has been stolen. The signal sent from the vehicle can automatically include the vehicle's position, speed, acceleration or deceleration rate, and direction. Law enforcement officials may send an instruction in response to limit the vehicle speed to no greater than 30 miles per hour until the unauthorized operator of the vehicle is apprehended. It should be noted that various fixed units may be strategically placed along highways, major intersections, toll booths, and bridges to monitor traffic and to relay messages back to law enforcement agencies.

Another law enforcement use can be to limit speeding of vehicles by notifying law enforcement agencies when a vehicle has exceeded a certain speed limit, e.g., 20% over the speed limit. A law enforcement official, in response, may send an instruction for the vehicle to slow down or risk a traffic citation. This can eliminate the need for "speed traps" and high speed police chases.

For public safety applications, specifically located fixed units can warn drivers as the vehicle approaches a traffic light at an intersection that the vehicle must slow down or stop because it will not "make" the green light. The traffic light can make this determination based upon the speed and direction of the mobile unit and the cycle of the traffic light.

Other selectively placed fixed units can warn drivers that an intersection or roadway is dangerous for various reasons, such as an accident, a sharp bend, or heavy traffic. The signals output by these locations can be periodically updated as weather and traffic conditions change. In the same manner, vehicles may be warned that a particular vehicle is driving in an erratic manner or that law enforcement officials are currently involved in a pursuit of the vehicle. The warnings to drivers are output through the AVI 46 and may include an audible warning, or may include a status light such as red, yellow, and green being located on the graphical operator interface of the AVI 46. In extreme circumstances, selectively placed fixed units may automatically overtake control of a vehicle, for example, during extremely icy conditions to slow the vehicle prior to the danger zone.

It should be noted that although the mobile units 16 were described hereinbefore as being located in a vehicle or in a fixed location, they can be incorporated as part of a cellular phone or other portable communication device.

The present invention is particularly adaptable for interfacing with the Internet and providing a wealth of information for all mobile unit operators. In one Internet-related embodiment, the website permits storage of information and system administration through the Internet. A system administrator operating at the website or the base station controller 20 monitors and tracks all mobile units 16. Through the system administrator, the fixed locations are provided with weather and traffic updates or advertisements which are specifically geared to the immediate vicinity of the fixed unit. In this manner, advertisers advertise both on the website and advertise their companies and products as vehicles approach or pass certain properties, stores, or business locations. This also permits stores to provide information to vehicles arriving or leaving the place of business, such as directions for parking or thanking them for their patronage.

The system administrator also provides centralized housekeeping functions in order to track all different types of information that are typically a nuisance to vehicle operators, such as the date their registration and insurance policy expire. The system administrator also tracks general vehicle maintenance information and traffic violation records. The tracking of vehicle maintenance can be particularly useful when a recall notification is issued from a manufacturer or even when regularly scheduled maintenance is required.

In a second Internet-related embodiment, the system 10 is used to aid law enforcement officials and insurance companies to determine when a traffic accident has occurred and to collect all of the detailed information regarding the traffic accident. This function is centralized in a website such as vehicleaccident.com. When an accident occurs, a signal is automatically sent to all vehicles involved (or in the vicinity) to transmit all pertinent information to vehicleaccident.com. This can include time, speed, direction, acceleration and deceleration, duration of trip, and other pertinent information such as the vehicle maintenance records, traffic citation records, insurance, and registration information. The system 10 permits all of this information to be stored in a centralized location at vehicleaccident.com for later review by law enforcement officials. The system 10 also stores law enforcement officials reports regarding the accident.

The insurance industry should benefit by having mobile unit operators agree in advance to accept a fact finding by an officer utilizing all of the information from the mobile units 16. This avoids costly litigation and subrogation. A mobile unit operator accepting these terms may be permitted special insurance discounts for agreeing to such.

In another embodiment, the system can provide mobile units that does not include a GPS unit. It can be similar to portable phone(s) operating on the same frequency(s). If a user tunes their radio to a particular station, they can receive a transmission through their car stereo system. The mobile unit, in this instance, can have the microphone inside of it so a user can speak "hands free". This embodiment allows the mobile unit to beep (or voice activate) if another user comes within range, advising both mobile units that they have someone they can talk to. The mobile unit detects another mobile unit by actually receiving the signal of the other mobile unit. Accordingly, positioning of either mobile unit is not required.

Referring to FIG. 7, one example method 700 of wireless communication between a vehicle maintenance tracking system and a vehicle is shown. At block 710, a communication link is received from a vehicle maintenance tracking system. At block 720, a microprocessor determines if the communication link is authorized. The determination is based on a security field and identification of the vehicle maintenance tracking system.

At block 730, a communication is received and the microprocessor automatically turns down the volume of a speaker in the vehicle comprising the mobile unit. A message is output via at least one of an audio and visual interface at block 740, and the communication is stored in a communication log at block 750.

Although the invention has been described in part by making detailed reference to example embodiments, such detail is intended to be instructive rather than restrictive. It will be appreciated by those skilled in the art that many variations may be made in the structure and mode of operation without departing from the scope of the invention as disclosed in the teachings herein.

What is claimed is:

1. A method of wireless communication between a vehicle maintenance tracking system and a vehicle comprising a mobile unit, the method comprising:
   receiving a communication link from a vehicle maintenance tracking system;
   determining by a microprocessor if the communication link is authorized, the determination is based on a security field and identification of the vehicle maintenance tracking system;
   receiving a communication and automatically turning down the volume of a speaker in the vehicle comprising the mobile unit by the microprocessor;
   outputting a message via at least one of an audio and visual interface; and
   storing the communication in a communication log.

2. The method of claim 1 wherein the determining further comprises a user accepting the communication link.

3. The method of claim 1 wherein the communication is at least one of voice and data.

4. The method of claim 1 wherein the outputting the message comprises displaying a status.

5. The method of claim 1 wherein the receiving the communication link comprises using Bluetooth wireless technology.

6. The method of claim 1 wherein the receiving the communication link comprises using radio frequency.

7. The method of claim 1 further comprising transmitting a second communication to the vehicle maintenance tracking system.

8. The method of claim 7 wherein the second communication comprises maintenance information.

9. The method of claim 1 wherein the communication comprises a control instruction from the vehicle maintenance tracking system.

10. The method of claim 1 wherein the vehicle maintenance tracking system comprises a remote unit.

11. The method of claim 1 wherein the outputting the message comprises using at least the speaker.

12. The method of claim 1 further comprising transmitting a second communication to the vehicle maintenance tracking system, the transmitting the second communication the vehicle maintenance tracking system repeating the communication to a remote unit.

13. The method of claim 1 further comprising transmitting a second communication to a remote unit, the transmitting the second communication comprising the remote unit repeating the communication to the vehicle maintenance tracking system.

14. The method of claim 1 wherein the receiving the communication link comprises downloading data from the vehicle maintenance tracking system.

15. The method of claim 1 wherein the outputting the message comprises using at least a second speaker.

16. The method of claim 1 wherein the at least one of the audio and visual interface comprises a heads-up display.

17. The method of claim 1 wherein the communication comprises maintenance information.

18. A method of wireless communication between a first mobile unit and a vehicle comprising a second mobile unit, the method comprising:
   receiving a communication link from the first mobile unit;
   determining by a microprocessor if the communication link is authorized, the determination being based on a security field and identification of the first mobile unit;
   receiving a communication and automatically turning down the volume of a speaker in the vehicle comprising the second mobile unit by the microprocessor;
   transmitting a message via at least one of an audio and visual interface; and
   storing the communication in a communication log.

19. The method of claim 18 further comprising the vehicle establishing a second communication link with a vehicle maintenance tracking system through the mobile unit.

20. The method of claim 19 further comprising receiving maintenance information via the second communication link with the vehicle maintenance tracking system.

21. The method of claim 19 wherein the communication comprises a control instruction from the vehicle maintenance tracking system.

22. The method of claim 18 wherein the determining comprises a user accepting the communication link.

23. The method of claim 18 wherein the receiving the communication comprises repeating the communication to a vehicle maintenance tracking system.

24. The method of claim 18 wherein the receiving the communication link comprises using radio frequency.

25. The method of claim 18 wherein the receiving the communication comprises downloading data from the mobile unit.

26. A wireless vehicle communication system comprising:
   a transceiver receiving a communication link from a mobile unit, the transceiver further receiving a communication from the mobile unit;
   a microprocessor programmed to determine if access to the communication link by the mobile unit is authorized, the determination being based on a security field and identification of the mobile unit, the microprocessor further programmed to automatically, upon the transceiver receiving the communication, turn down the volume of a speaker of the vehicle communication system, the microprocessor further programmed to store the communication in a communication log;
   an electromechanical system associated with the transceiver; and
   an audio-visual interface associated with the electromechanical system displaying the communication link and outputting the communication.

27. The vehicle of claim 26 wherein the transceiver employs Bluetooth.

28. A wireless vehicle communication system comprising:
   a microprocessor programmed to determine whether access to a communication link between a vehicle communication system and a mobile unit is authorized, the microprocessor further programmed to automatically, upon receiving a communication, turn down the volume of a speaker of the vehicle communication system, the microprocessor further programmed to store the communication in a communication log;
   a transceiver associated with the microprocessor, the transceiver receiving the communication link from the mobile unit;
   a memory associated with the microprocessor, the memory storing a control instruction;
   an electromechanical system associated with the microprocessor, the electromechanical system exerting the control instruction; and
   an audio-visual interface associated with the electromechanical system, the audio-visual interface displaying the communication link.

29. A method of tracking vehicle maintenance information by a wireless communication system, comprising:
- identifying by a communication system a vehicle comprising a mobile unit with an identifier;
- determining maintenance information associated with the vehicle;
- generating a message comprising the maintenance information, the message comprising a communication packet constructed from a plurality of data fields, the data fields including a priority field, and the identifier;
- transmitting the message comprising the communication packet to the mobile unit, the message comprising the maintenance information; and
- receiving a confirmation of receipt from the mobile unit comprising storing the confirmation of receipt in a communication log.

30. A method of tracking vehicle maintenance information by a wireless communication system, comprising:
- receiving a signal transmitted by a vehicle comprising a mobile unit, the signal comprising a vehicle identifier and a status of the vehicle;
- determining maintenance information associated with the vehicle, the determining comprises parsing the signal to determine the vehicle identifier and the status;
- generating a message comprising the maintenance information, the message comprising a communication packet constructed from a plurality of data fields, the data fields including a priority field, and the vehicle identifier;
- transmitting the message comprising the communication packet to the mobile unit, the message comprising the maintenance information; and
- receiving a confirmation of receipt from the mobile unit comprising storing the confirmation of receipt in a communication log.

31. A method of tracking vehicle maintenance information by a wireless communication system, comprising:
- receiving a signal transmitted by a vehicle comprising a mobile unit, the signal comprising a vehicle identifier and a status of the vehicle;
- storing the signal in a first communication log, the first communication log including the vehicle identifier, a transmission time, a transmission date, and the status;
- determining maintenance information associated with the vehicle, the determining comprises parsing the signal to determine the vehicle identifier and the status;
- constructing a communication comprising at least one communication packet, the at least one communication packet comprising the maintenance information, an address, and an identification of the vehicle;
- forwarding the at least one communication packet to a router;
- transmitting the at least one communication packet over the Internet by the router via the address; and
- storing the communication through the Internet in a second communication log.

* * * * *

UNITED STATES PATENT AND TRADEMARK OFFICE
CERTIFICATE OF CORRECTION

| | |
|---|---|
| PATENT NO. | : 7,599,715 B2 |
| APPLICATION NO. | : 12/389245 |
| DATED | : October 6, 2009 |
| INVENTOR(S) | : Richard B. Himmelstein |

It is certified that error appears in the above-identified patent and that said Letters Patent is hereby corrected as shown below:

IN THE SPECIFICATION

At column 1, line 7, after "This application", delete "claims priority from" and insert therefor --is a continuation of--.

Signed and Sealed this
Twenty-fifth Day of June, 2013

Teresa Stanek Rea
*Acting Director of the United States Patent and Trademark Office*